July 25, 1961
I. D. NOBLE
2,993,738
TRACTION SHOE ASSEMBLY
Filed Aug. 26, 1960
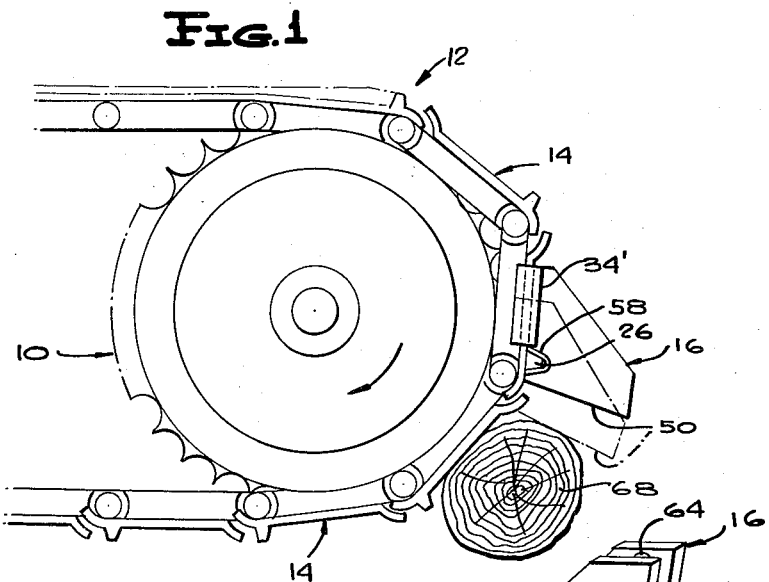
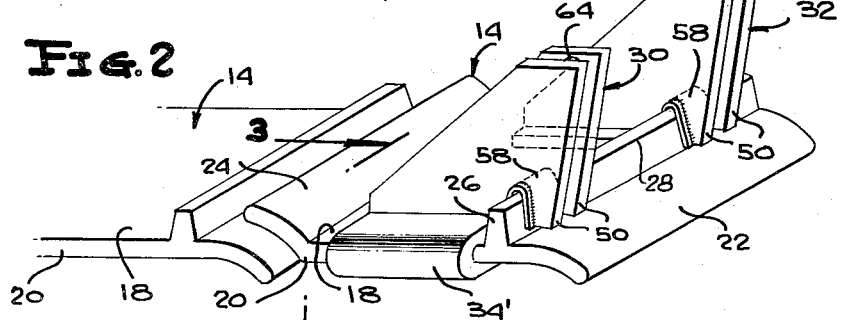
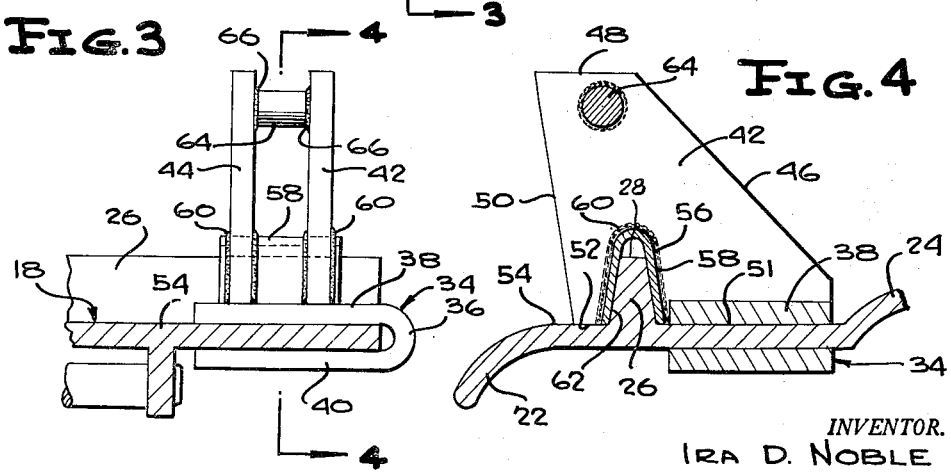
INVENTOR.
IRA D. NOBLE
BY
McMorrow, Berman & Davidson
ATTORNEYS

United States Patent Office 2,993,738
Patented July 25, 1961

2,993,738
TRACTION SHOE ASSEMBLY
Ira D. Noble, New Florence, Mo.
Filed Aug. 26, 1960, Ser. No. 52,167
6 Claims. (Cl. 305—55)

This invention relates to an improved traction shoe assembly for removable attachment to endless tractor chains.

The primary object of the invention is the provision of a simpler, more effective, and more easily attached traction shoe assembly which comprises a pair of similar but reversed shoes for removable installation on a tractor chain tread plate at opposite sides thereof, and which are effective in conjunction with a log or pole, thrown under a tractor chain, to pull the tractor out of mud, from which the tractor could not otherwise move itself.

Another object of the invention is to provide traction shoes of the character indicated above which require no bolts, clamps, or screws, or special tools for their installation, but which are adapted to be installed simply by slipping the shoes over the side edges of a tractor chain tread plate.

A further object of the invention is the provision of traction shoes of the character indicated above which are more rugged and serviceable and are composed of a small number of simple and easily assembled parts.

Other important objects and advantageous features of the invention will be apparent from the following description and the accompanying drawings, wherein, for purposes of illustration only, a specific form of the invention is set forth in detail.

In the drawings:

FIGURE 1 is a fragmentary side elevation of an endless tractor chain trained over a sprocket wheel, showing a traction shoe assembly of the invention applied to a tread plate of the chain;

FIGURE 2 is an enlarged perspective view showing in detail installation of the shoe assembly on a tractor chain tread plate;

FIGURE 3 is a fragmentary vertical section taken on the line 3—3 of FIGURE 2; and, FIGURE 4 is a vertical longitudinal section taken on the line 4—4 of FIGURE 3.

Referring in detail to the drawings, wherein like numerals designate like parts throughout the several views, there is shown a sprocket drive wheel 10 over which is trained a conventional endless tractor chain 12 which is composed of hingedly connected tread plates 14, to one of which is applied a traction shoe assembly in accordance with the present invention. Each tread plate 14 comprises a flat intermediate portion 18 having parallel side edges 20, an inwardly curved leading flange 22, and an outwardly curved trailing flange 24, on related ends of the intermediate portion 18. At the juncture of the trailing flange 24 with the intermediate portion, and extending across the tread plate, is an outstanding rib 26 which is of isosceles triangular cross section, and has a truncated apex 28.

The traction shoe assembly 16 comprises a pair of similar but reversed left- and right-hand shoes 30 and 32, respectively. The right-hand shoe 32, as shown in detail in FIGURES 3 and 4, comprises a rigid U-shaped horizontal clip 34 which is composed of a bight portion 36, a flat outer arm 38, and a similar flat inner arm 40, the arms being parallel and spaced to snugly receive therebetween the intermediate tread plate portion 18, the arms being of lengths to extend substantial distances inwardly from the related side edge 20 of the portion 18. The clip 34 is of heavy gauge rigid metal and is of a width to occupy the major part of the width of the tread plate portion 18.

Suitably fixed on the outer side of the outer clip arm 38, at locations spaced from the ends thereof, is a pair of outstanding parallel spaced, similar outer and inner shock plates 42 and 44, respectively, which are normal to the clip arm 38 and are disposed at right angles to the transverse axis of the clip 34, and are substantially longer than the width of the clip 34.

As shown in FIGURE 4, the chock plates 42 and 44 are flat and substantially trapezoidal in shape, and the base sides of the chock plates are substantially as long as the width of the intermediate portion 18 of the tread plate 14, their hypotenuse edges 46 are inclined outwardly in the direction of travel of the tractor chain 12, and their apices are truncated, as indicated at 48. The leading or altitude edges 50 of the chock plates are inclined outwardly, in the direction of travel of the tractor chain 12, at similar slight angles.

Only a trailing portion 51 of the base edges of the chock plates are fixed upon the outer clip arm 38, the remaining leading portions 52 of the base edges being inset relative to the portions 50, and being engaged with the outer surface 54 of the intermediate portion 18 of the tread plate. The leading portions 52 have triangular indentations 56 therein, of the same shape as but larger than the triangular rib 26, and a V-shaped saddle 58 is suitably secured in the indentations, as indicated at 60. The saddle 58 extends between the chock plates and, at its ends, reaches outwardly beyond the chock plates. The aperture 62 of the saddle 58 is shaped to conformably and snugly receive the rib 26. A short brace rod 64 extends between the chock plates, in the regions of the truncated apices thereof, and is suitably fixed thereto, as indicated at 66.

The left-hand shoe 30 is the same in construction as the above described right-hand shoe 32, except that the clip 34' thereof is reversed, with respect to the clip 34 of the right-hand shoe 30.

The shoes are installed simply by engaging the clips over the side edges 20 of the intermediate portion 18 of the tread plate, at the same time that the saddles 58 are engaged over related ends of the rib 26, the interfitting of the engaged parts preferably being close enough that there is no relative movement between the shoes and the tread plate, and the shoes must be forced into plate, as by the use of a maul, and forcibly removed.

With a traction shoe assembly in place on a tread plate, as shown, the altitude or leading edges 50 of the chock plates serve as cams for forcing a log or pole 68, placed on or in the ground thereunder, inwardly toward the next leading tread plate 14 of the chain 12, as the chain is moved in the direction of the arrow in FIGURE 1, so that the shoe assembly takes a firm grip on the log or pole, and so that the chain can climb efficiently over the log or pole, without, as is the case with some other forms of traction shoes, a tendency to lose the grip on the log or pole and to drag the log or pole.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate.

2. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate, said chock plates having base edges having trailing portions fixed to the clips and leading portions bearing upon the outer surface of the tread plate.

3. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate, said chock plates having base edges having trailing portions fixed to the clips and leading portions bearing upon the outer surface of the tread plate, said base edges having indentations in which the saddles are fixed.

4. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate, said chock plates having base edges having trailing portions fixed to the clips and leading portions bearing upon the outer surface of the tread plate, said base edges having indentations in which the saddles are fixed, said chock plates being flat and substantially trapezoidal with their hypotenuse edges trailing.

5. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate, said chock plates having base edges having trailing portions fixed to the clips and leading portions bearing upon the outer surface of the tread plate, said base edges having indentations in which the saddles are fixed, said chock plates being flat and substantially trapezoidal with their hypotenuse edges trailing, said chock plates having truncated apices.

6. In combination, a tractor chain tread plate having an outer surface and side edges, and an outstanding transverse rib, a traction shoe assembly comprising a pair of similar but reversed traction shoes having saddles engaged over said rib, and clips engaged around related side edges of the tread plate, each of said shoes having a pair of laterally spaced outstanding chock plates having leading edges, said leading edges being angled outwardly in the direction of movement of the tread plate, said chock plates having base edges having trailing portions fixed to the clips and leading portions bearing upon the outer surface of the tread plate, said base edges having indentations in which the saddles are fixed, said chock plates being flat and substantially trapezoidal with their hypotenuse edges trailing, said chock plates having truncated apices, and brace means extending between and fixed to the apices of the chock plates of each shoe.

References Cited in the file of this patent

FOREIGN PATENTS

| 451,569 | Germany | Nov. 6, 1925 |
| 666,704 | Great Britain | Feb. 20, 1952 |
| 511,317 | Canada | Mar. 29, 1955 |